United States Patent [19]
Thomassin et al.

[11] Patent Number: 5,931,681
[45] Date of Patent: Aug. 3, 1999

[54] DEVICE FOR CONNECTION BETWEEN TWO CABLES, ONE OF WHICH IS ABLE TO MOVE TRANSLATIONALLY AND/OR ROTATIONALLY WITH RESPECT TO THE OTHER

[75] Inventors: René Thomassin, Velaux; Jean-Paul Senglat, Vitrolles, both of France

[73] Assignee: Eurocopter, Cedex, France

[21] Appl. No.: 08/900,399

[22] Filed: Jul. 21, 1997

[30] Foreign Application Priority Data

Jul. 23, 1996 [FR] France .................................. 96 09222

[51] Int. Cl.⁶ .................................................. H01R 39/00
[52] U.S. Cl. ................................................. 439/25; 439/32
[58] Field of Search .................. 439/10, 18, 20, 439/21, 23, 25, 32

[56] References Cited

U.S. PATENT DOCUMENTS

| | | | |
|---|---|---|---|
| 1,152,397 | 9/1915 | Cooper | 439/32 |
| 2,673,966 | 3/1954 | Larkin | 439/10 |
| 4,444,445 | 4/1984 | Davies et al. | |
| 4,515,521 | 5/1985 | Takeo et al. | |
| 4,850,880 | 7/1989 | Zayat, Jr. et al. | |

FOREIGN PATENT DOCUMENTS

| | | | |
|---|---|---|---|
| 2507965 | 9/1976 | Germany | 439/23 |
| 44 06 042 | 10/1994 | Germany . | |

*Primary Examiner*—Neil Abrams
*Assistant Examiner*—Javad Nasri
*Attorney, Agent, or Firm*—Henderson & Sturm

[57] ABSTRACT

The present invention is directed to a device which includes a cylindrical support provided with coaxial conducting rings, and a brush support carrying brushes respectively in sliding contact with the rings. An extension of this support constitutes another support for a set of longitudinal conducting tracks linked respectively to the brushes. The brushes in sliding contact with the tracks are carried by a brush support which is able to move translationally on the support. There may, therefore, be relative translational and rotational movements between a cable, the conductors of which are linked to the rings, and a cable, the conductors of which are linked to the brushes, while still providing electrical continuity between them. The device of the present invention is useful in supplying current to the blades of the tail rotor of a helicopter from a structure able to move translationally.

12 Claims, 7 Drawing Sheets

DEVICE FOR CONNECTION BETWEEN TWO CABLES, ONE OF WHICH IS ABLE TO MOVE TRANSLATIONALLY AND/OR ROTATIONALLY WITH RESPECT TO THE OTHER

CROSS-REFERENCE TO RELATED APPLICATIONS

Not Applicable.

Not Applicable.

BACKGROUND OF THE INVENTION

1. Field of the Invention

The present invention relates to a device for connection between the respective conductors of two cables which can undergo rotational and/or translational movements one with respect to the other, this device including at least one series of sliding contact elements which are linked respectively to the conductors of one of the cables and carried by one support, and at least one other series of sliding contact elements which are linked respectively to the conductors of the other cable, in sliding contact, respectively, with the sliding contact elements of the first series mentioned and carried by another support, which is able to move with respect to the first support mentioned.

The invention may be used in various applications, in all cases when it is necessary to pass a current, small or large, two-phase, three-phase, etc., with or without an earth, between the conductors of two cables, one of these cables being fastened to a structure which is able to move translationally and/or rotationally with respect to the structure to which the other cable is fastened.

An application more particularly, but not exclusively, intended by the present invention is that in which it is desired to supply current, for example heating (de-icing) current, to the blades of a helicopter tail rotor, which requires use of a rotary output terminal block, this being based on a power cable which itself is able to move translationally, being fastened to the servocontrol rod for changing the pitch of the blades, passing through the hub of this tail rotor.

The connection device intended to fulfil these functions will be subjected to a harsh operating regime, a helicopter tail rotor being able to rotate at a speed of about 1250 rpm and the control rod for changing the pitch of the blades being able to move translationally with an amplitude of ±40 mm, at a speed of approximately 120 mm/s and at a frequency of a few Hz.

2. Description of the Prior Art

Currently, in certain helicopters fitted with electrical equipment for protecting the blades from ice deposition, the electrical de-icing sleeving is located outside the helicopter rotor and transports the energy, necessary for electrothermally protecting the blades, from the commutator of the rotor hub. Energy is transferred from inside the helicopter to the outside by means of an electrical commutator which combines a stationary part and, fixed to the latter, the rotating part, rings provided with brushes fulfilling this function.

The commutator of the tail rotor blades is fitted around the drive shaft of the hub of the tail rotor, making maintenance on it difficult. This is because any removal of the commutator requires dismantling the rotor shaft in the workshop using suitable tools, hence incurring considerable cost and maintenance time. In addition, on account of the external diameter of the commutator, the latter is designed for high peripheral velocities at the rings and brushes, hence increasing the wear of these components. Power is brought, on the outside, from the commutator to the blades via electrical sleeving subjected to aerodynamic stresses (centrifugal force, vibrations, movement of the blades, translational movement of the blade-pitch-control spider, etc.) due to the sleeving passing along through the various zones.

In order to minimize the maintenance problems and to decrease the stresses in the sleeving, the object of the invention is therefore to construct an entirely fitted-out and modular electrical connection device.

In order to avoid removing the hub and returning it to the workshop in the event of a failure, the object of the invention is also to make it possible to fit this connection device inside the tail rotor hub. In order for this to be accomplished, this connection device must not only be able to be contained in the hub but must also be able to follow, on its input side, the translational movement of the aforementioned servocontrol rod and to follow, on its output side, the rotation of the tail rotor to be supplied with current, as already indicated above.

BRIEF SUMMARY OF THE INVENTION

In this more particular context, the aim of the invention is therefore to obtain a small connection device capable of allowing at the same time simultaneous relative translational and/or rotational movements between the respective structures carrying the two cables to be connected.

Depending on the specific problems and applications, attempts will be made to decrease the size of this device, above all in the radial direction or above all in the axial direction, or alternatively concurrently in both these directions and in proportions which may vary between the two of them, depending on the case.

To solve the problems mentioned above, a device according to the invention, of the abovedefined general type, is characterized in that it includes:

- at least one system of rotational sliding contacts, namely of the type comprising, in respect of two series of sliding contact elements, two respective supports, one of which may be rotationally driven with respect to the other;
- at least one system of translational sliding contacts, namely of the type comprising, in respect of two series of sliding contact elements, two respective supports, one of which may be translationally driven with respect to the other; and in that
- the conductors of one of the cables are linked respectively to the sliding contact elements of one of the two series of sliding contact elements of the system of rotational sliding contacts;
- the sliding contact elements of the other series of sliding contact elements of the system of rotational sliding contacts are linked respectively to the sliding contact elements of one of the two series of sliding contact elements of the system of translational sliding contacts, these two series being carried by a common support; and
- the sliding contact elements of the other series of sliding contact elements of the system of translational sliding contacts are linked respectively to the conductors of the other cable.

Thus, continuity of the electrical circuit between the two cables is well provided, while enabling them to undergo, one with respect to the other, translational and rotational movement.

The expression "sliding contact elements" in the above is a generic term able to denote both conventional brushes or wiper wires and rings or tracks with which these brushes or wiper wires are held in sliding contact, it being understood that, in a given system, the brushes or wiper wires are theoretically interchangeable with the rings or tracks with which they interact.

Thus, the invention may be further characterized, on the one hand, in that the said series of sliding contact elements of the said system of rotational sliding contacts comprise brushes (or wiper wires) in sliding contact respectively with coaxial conducting rings on a first cylindrical support, the support for the said brushes and the support for the said coaxial rings being able to undergo rotational movement one with respect to the other, and, on the other hand, in that the said series of sliding contact elements of the said system of translational sliding contacts comprise brushes in sliding contact respectively with longitudinal conducting tracks on a second cylindrical support, the support for the said longitudinal tracks and the support for the corresponding brushes being able to undergo translational movement one with respect to the other.

Figure 8:
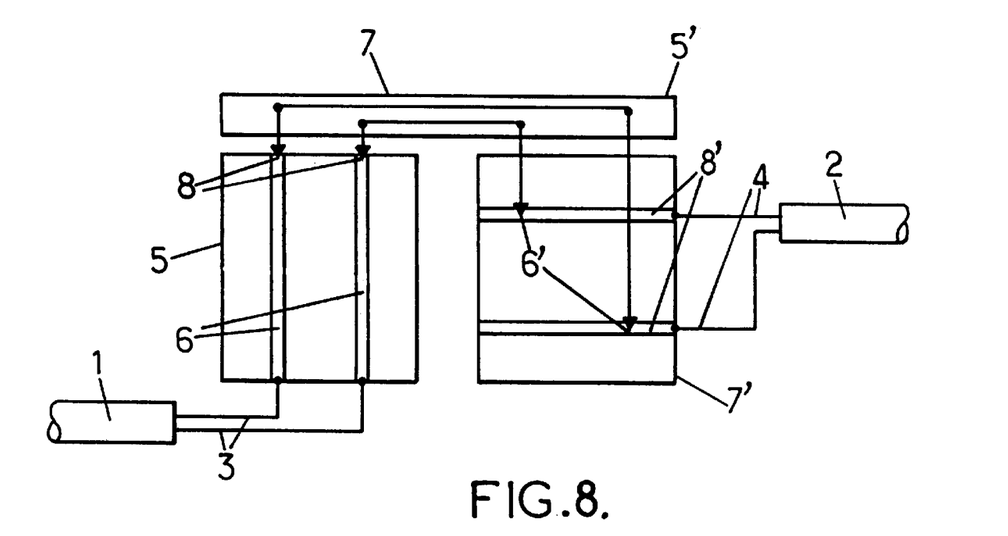
Figure 9:
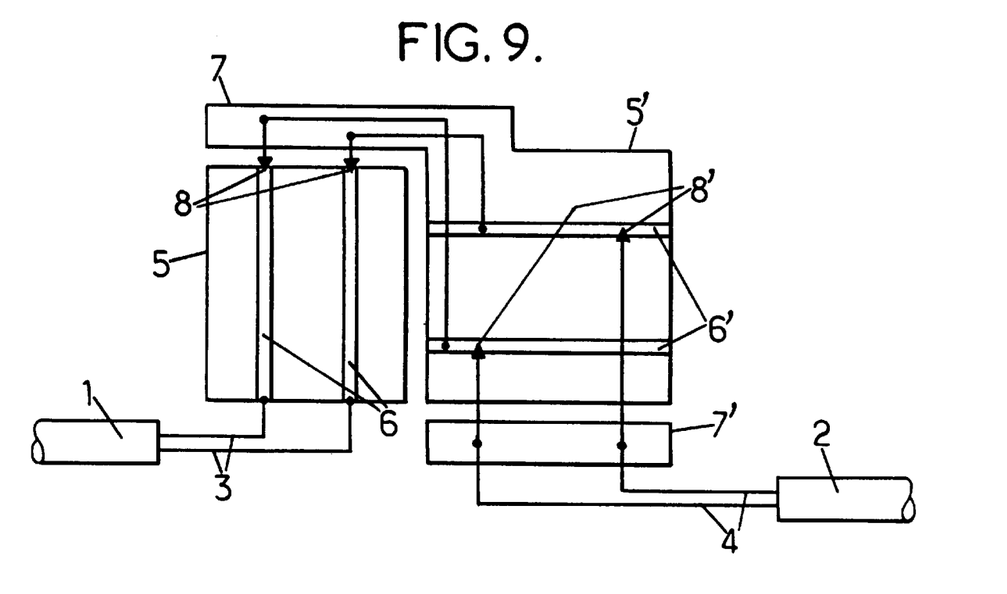

In this way, the conductors of one of the cables may terminate on brushes or coaxial rings, or longitudinal tracks, and the conductors of the other cable may likewise leave from brushes or coaxial rings, or longitudinal tracks. FIGS. 7, 8, 9 and 10 (which may also be referred to herein as FIGS. I, II, III and IV, respectively) in the drawings appended hereto show the four possible basic combinations, with regard to the structure of the device. In these figures, in order to simplify matters, only cables 1 and 2 have been shown, these having only two conductors each, respectively labelled 3 and 4. The system of rotational sliding contacts therefore only has two coaxial rings 6 and two brushes 8 as shown in FIGS. 8 and 9 (FIGS. II and III) or two coaxial rings 8 and two brushes 6 FIGS. 7 and 10 (FIGS. I and IV), and the system of translational sliding contacts has, likewise, only two longitudinal tracks 6' and two brushes 8' FIGS. 7 and 9 (FIGS. I and III) or two longitudinal tracks 8' and two brushes 6' FIGS. 8 and 10 (FIGS. II and IV); in order to make the drawing clearer, the brushes are shown diagrammatically by arrowheads, and the brushes 8' or 6' of the system of translational sliding contacts have been shifted axially, although in principle they lie, of course, in the same radial plane, perpendicular to the axis of the corresponding cylindrical support 5' FIGS. 7 and 9 (FIGS. I and III) or 7' FIGS. 8 and 10 (FIGS. II and IV).

In each of these figures, it will be understood that the cable 1 may be the current inlet cable and the cable 2 the outlet cable, or vice versa.

It will also be possible to effect all the possible combinations of movement between, on the one hand, the supports 5, 7 which are able to move rotationally one with respect to the other and, on the other hand, the supports 5', 7' which are able to move translationally one with respect to the other, the support common to the two systems of sliding contacts, which is stationary, able to move translationally and/or able to move rotationally, always being labelled 5', 7.

The table below shows the four possible combinations of movement, applicable to each of the four theoretical diagrams in FIGS. I to IV, R denoting that the element in question is rotationally driven, T denoting that it is translationally driven and the letter O denoting a stationary state:

| Case | Current inlet or outlet cable 1 | Column support 5', 7 | Current outlet or inlet cable 2 |
|---|---|---|---|
| | ← R → | ↓ ↓ | ← T → |
| A | O | R | R + T |
| B | R | O | T |
| C | T | R + T | R |
| D | R + T | T | O |

This table shows that there is always rotational movement (R) between the common support 5', 7 and the cable 1, and that there is always translational movement (T) between this same common support and the cable 2.

Figure 7:
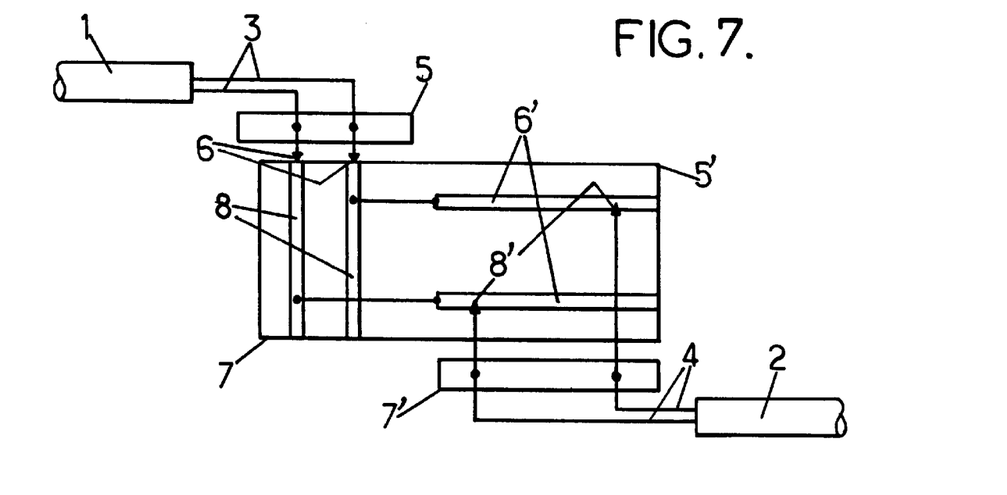
FIG. 7, FIG. 8, FIG. 9, and FIG. 10, show four possible basic combinations with regard to the structure of the device, and are also referred to herein as FIG. I, FIG. II, FIG. II, and FIG. IV, respectively.
Figure 10:
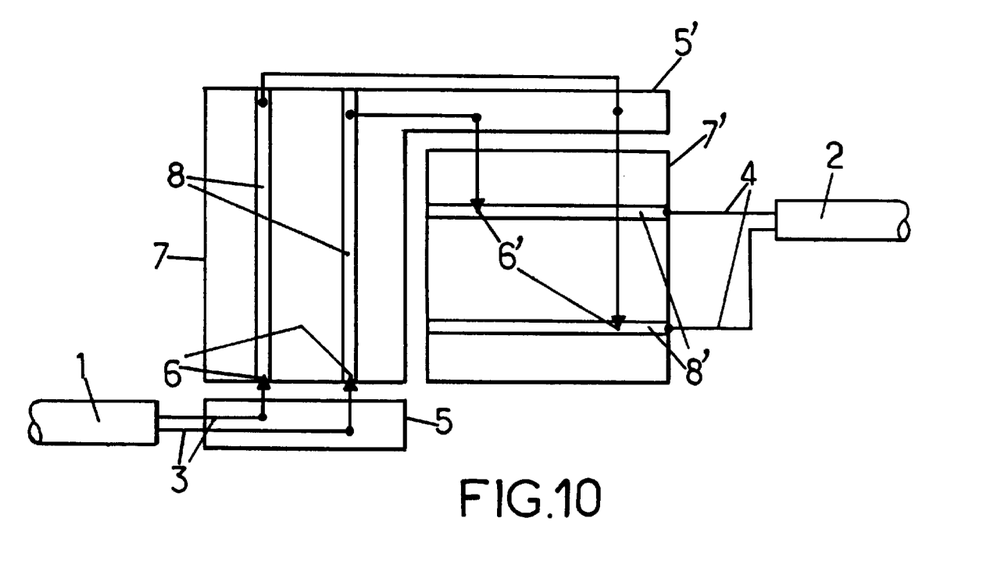

This table also shows that, in the variants in FIGS. 7 and 10 (FIGS. I and IV), all the abovedenoted cases A, B, C, D and, in the variants in FIGS. II and III, the abovedenoted cases A and C entail the use of at least one rotary support for the brushes or wiper wires. In these cases, in order to prevent the brushes from separating from their respective rings or tracks by the centrifugal force, the conducting rings or tracks in question may be designed so that they are provided inside a hollow cylindrical support, the corresponding support for the brushes or wiper wires then being arranged inside this cylinder, the centrifugal force consequently acting on the brushes or wiper wires in the radial direction that tends to press them against the respective rings or tracks.

Within the framework of practical construction, a number of variants may also be envisaged.

For example, the device may include a first system of translational sliding contacts comprising brushes in sliding contact respectively with longitudinal conducting tracks on a cylindrical support and a second system of translational sliding contacts comprising brushes in sliding contact respectively with longitudinal conducting tracks on another cylindrical support, those of the sliding contact elements of the system of rotational sliding contacts which are linked to the systems of translational sliding contacts being connected in respect of some of them to the sliding contact elements of one of the said systems of translational sliding contacts and in respect of some of them to the sliding contact elements of the other system of translational sliding contacts.

By virtue of this arrangement, those parts of the device which transmit power currents may be separated more easily from those parts which transmit, for example, control or measurement signals.

According to a subvariant of this arrangement, the said longitudinal conducting tracks may be arranged in at least two series of translational sliding contact elements, following axially one after the other on the same cylindrical support.

According to another subvariant, having the advantage of not increasing the axial length of the device, the said longitudinal conducting tracks, and likewise their respective brush supports, may be arranged in at least two series of translational sliding contact elements on two coaxial cylindrical supports, one of which surrounds the other, at least partially, and which are fastened to each other.

Whatever the embodiment, it will be more advantageous to ensure that the device includes a splined guiding system between the said common support and the other support for the sliding contact elements of the system or systems of corresponding translational sliding contacts and that the said common support surrounds, at least partially, the other support for the said system of rotational sliding contacts, thereby enabling the axial length of the device to be decreased.

However, if a considerable axial length is allowed, it is possible to merge the system of rotational sliding contacts with the system of translational sliding contacts. Referring, for example, to the theoretical embodiment in FIG. 7 (FIG. I), it is conceivable to replace the rings 8 and the longitudinal tracks 6' by conducting rings 6, that is to say by cylinders having the same length as the longitudinal tracks 6' (for the same amplitude of translational movement of the two cables 1 and 2).

A device according to the invention may therefore also be characterized in that the said systems of rotational sliding contacts and of translational sliding contacts are merged into a single system of rotational and translational sliding contacts and in that the conductors of one of the cables are linked respectively to a series of sliding contact elements of the said system and the conductors of the other cable are linked to another series of sliding contact elements of the said system, the respective supports for the two said series of sliding contact elements being able to be rotationally and translationally driven one with respect to the other.

In particular, one of the said series of sliding contact elements may consist of brushes carried by a support, and the other series of sliding contact elements may consist of coaxial cylindrical rings carried by a cylindrical support.

BRIEF DESCRIPTION OF THE SEVERAL VIEWS OF THE DRAWINGS

Practical embodiments of the invention will now be described by way of entirely non-limiting examples, with reference to the other figures in the drawing appended hereto, in which.

DETAILED DESCRIPTION OF THE INVENTION

Figure 1:
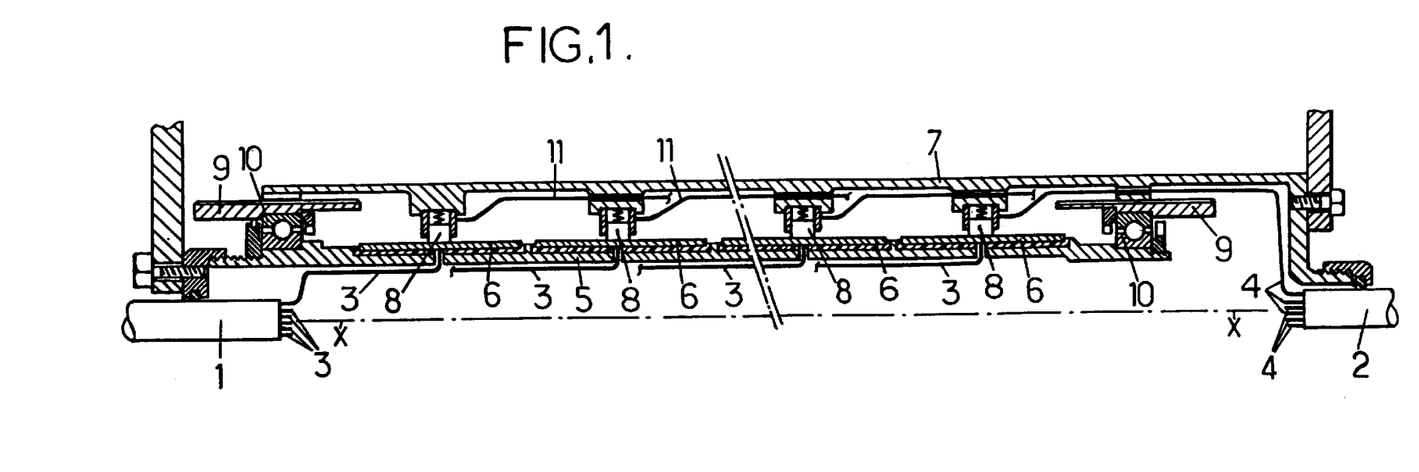
FIG. 1 is a view, in axial half-section, of a first embodiment of a device according to the invention, which includes a cylindrical support having a number of coaxial rings, each one extending in the longitudinal direction.

In the embodiment in FIG. 1, two electrical cables, labelled 1 and 2, have, respectively, conductors 3 and 4, these cables being able to move rotationally and/or translationally one with respect to the other, these movements being performed about an axis X—X. The object of the device according to the invention is to establish a permanent connection between these conductors 3 and 4.

For this purpose, it includes, on the one hand, a cylindrical support 5 carrying a number of coaxial conducting rings 6 separated one after the other by a thin insulating gap and linked respectively to the conductors 3 of the cable 1. Moreover, this device includes a brush support 7 spaced apart radially from the support 5 and the brushes of which, labelled 8, slide respectively over the rings 6 and are respectively linked to the conductors 4 of the other cable 2 via connections 11 which are the natural extensions of the conductors 4. With each brush having a width l in the axial direction, the rings 6 may be chosen to have an axial length L such that L=2d+l, where d is the maximum amplitude of translational movement, in both directions, and starting from a middle position, of one of the cables with respect to the other, in the direction X—X. Thus, for example, if d=±40 mm and if l=10 mm, L will be equal to 2×40+10=90 mm per ring.

The brush support 7 can move translationally in the direction X—X and relative to the support 5, being guided by guiding splines 9 which are themselves carried by the support 5 via ball bearings 10, or the like. Thus, there may be relative translational and/or rotational movement between the supports 5 and 7, and therefore between the cables 1 and 2.

It should also be noted, and this comment is also valid for all the embodiments, that the rings 6 could be provided on the inside of the support 5, instead of being provided on the outside, as in the drawing in FIG. 1; in this case, it would be sufficient to arrange the support 7 for the brushes 8 inside the support 5, according to an arrangement which is the opposite of that shown.

Whatever the practical details of such an embodiment, where there is one ring 6 per conductor 3 or 4, it may be seen that the axial length of the device rapidly becomes quite considerable. For example, if there are twelve conductors 3 and therefore twelve rings 6, the total axial length of the support 5 will already be at least 12×90=1080 mm, not including the gaps between rings.

Figure 2:
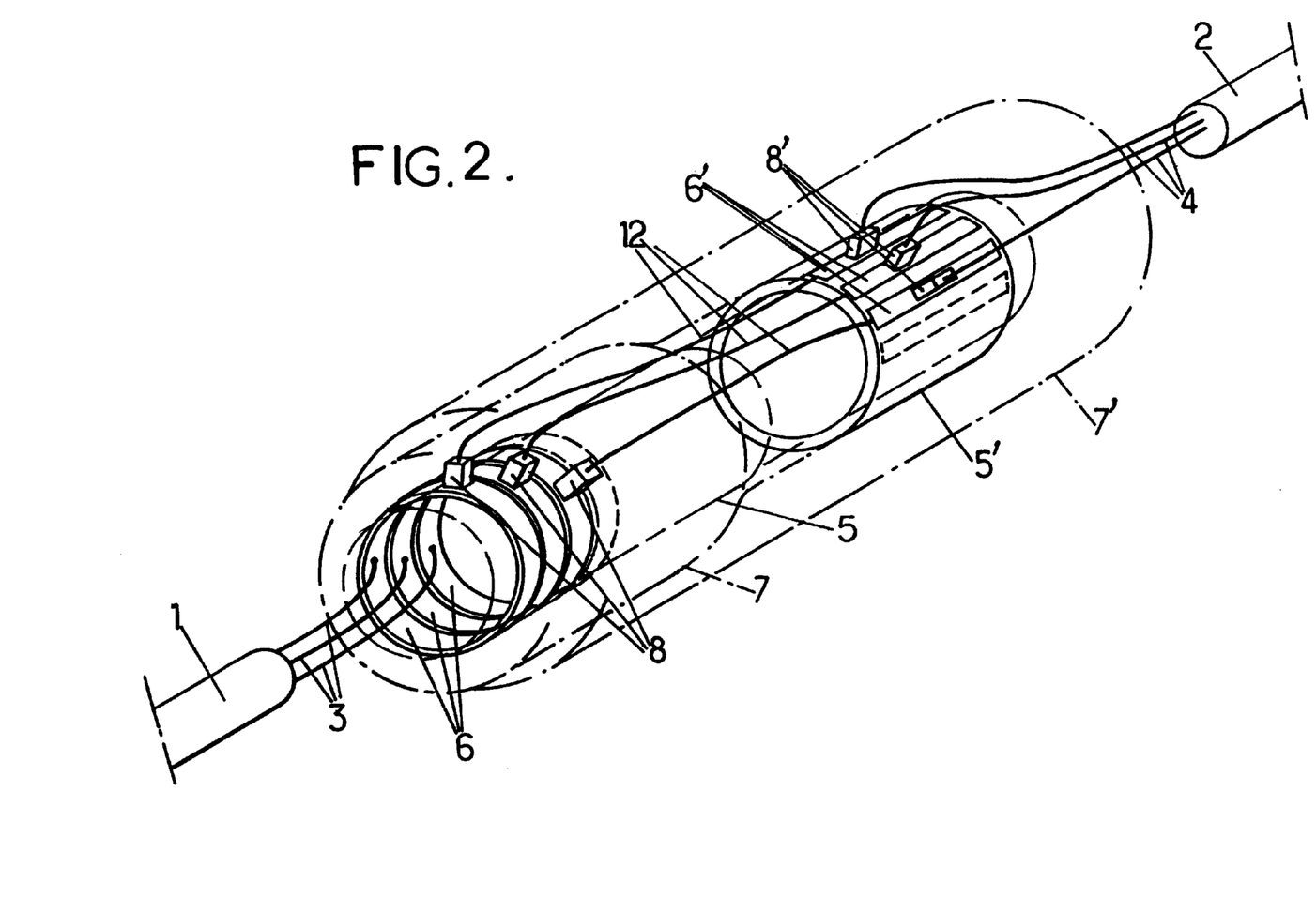
FIG. 2 is a simplified view, in perspective, of a second embodiment of a device according to the invention.

In order to decrease the resulting axial length of the connection device in its entirety, embodiments similar to that in FIG. 2, all based on the same principle, may be adopted.

Figure 3:
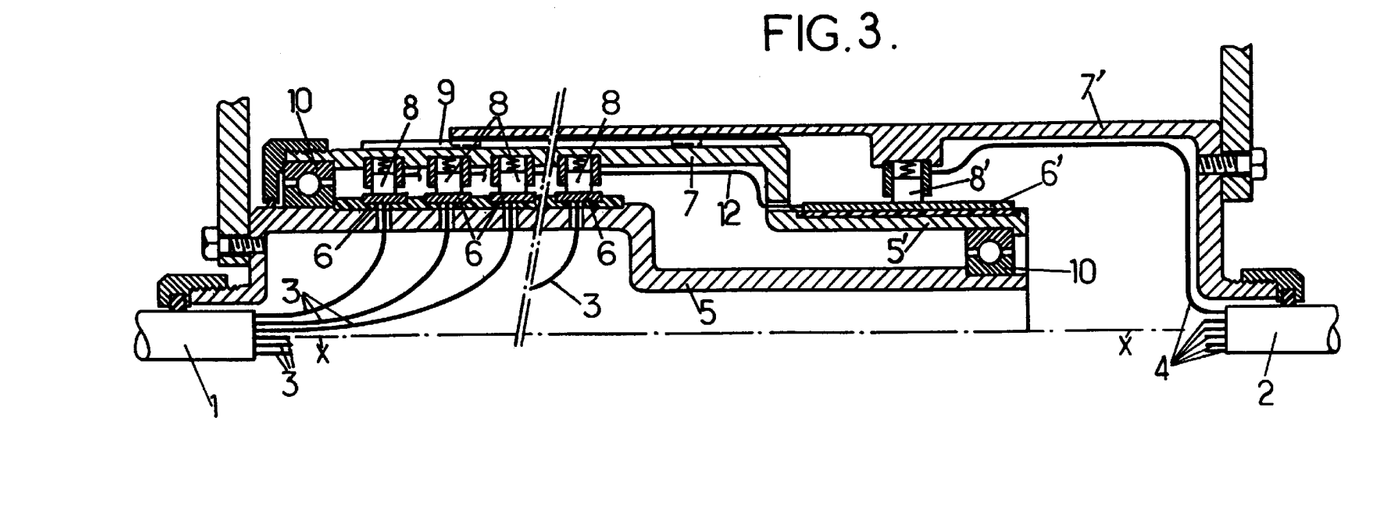
FIG. 3 shows, in axial half-section, a practical embodiment of the variant in FIG. 2.

In FIG. 2, and in order to simplify the drawing, brush supports 7 and 7' have been shown merely in outline by dotted lines, although they may be easily imagined and are also shown in FIG. 3. Likewise, the coaxial rings 6 have been shown, but without showing their support 5. In this embodiment, the coaxial rings 6, respectively linked to the conductors 3, each have only a width l equal to (or barely greater than) the width of the brushes 8, these therefore not being designed, contrary to the embodiment in FIG. 1, to move axially with respect to the support 5 for the rings 6. However, in order for the cables 1 and 2 to be able, as in the previous embodiment, to move not only rotationally but also translationally one with respect to the other, the two functions are separated here, the translational function being provided by another support, labelled 5'. This support 5', fastened to the support for the brush 7 of the rotary system, carries, so as to be uniformly distributed around its periphery, as many longitudinal tracks 6' as there are rings 6, the brushes 8 carried by the brush support 7 being respectively linked by conductors 12 to one of the ends of the said tracks 6'. The other brush support 7' carries brushes 8', respectively in contact with the longitudinal tracks 6' and respectively linked to the conductors 4 of the cable 2. In this way, electrical continuity between the conductors 3 and the conductors 4 is provided, while still allowing, between the cables 1 and 2, relative rotational movement (between the rings 6 and the brushes 8) and relative translational movement (between the tracks 6' and the brushes 8'). It may be imagined, for example, that the support 5 for the rings 6 is made in the form of a stator, that is to say a stationary part linked to a stationary cable 1, while the rotating part or rotor will include the brushes 8, the support 5' with its tracks 6', and the brushes 8', as well as the cable 2 and the respective brush supports (7, 7'), the brushes 8' with their support 7', and the cable 2 furthermore forming part of a structure suitable for moving translationally with respect to the stator and to its brushes (case A in the above table).

Referring again to the dimensional aspect, that is to say the question of the axial length of the connection device in this embodiment, and assuming that the number of conductors 3 and 4 is still twelve, the following is found:

the twelve rings 6 occupy an axial length barely greater than 12×l, i.e. 12×10=120 mm;

the support 5', still assuming that it has an amplitude of translational movement of ±40 mm, will have the following approximate length: 2×40+10=90 mm, 1 denoting the axial length of the brushes 8 and 8', assumed to be equal to 10 mm.

The theoretical axial length of the device is, in this case, barely greater than 120+90=210 mm, compared with 1080 mm for the embodiment in FIG. 1.

The hybrid device in FIG. 2 (separate translational and rotational functions) may be implemented according to a number of variants, a few of which will be described below.

In the practical embodiment in FIG. 3, which corresponds to the theoretical case in FIG. 9 (FIG. III), the same labels have been used as in FIG. 2. This embodiment shows that the support 5 (not shown in FIG. 2) for the rings 6 serves at the same time as a bearing for the rolling bearings 10 for its brush support 7; it may also be seen that this support serves at the same time as support 5' for the longitudinal tracks 6' linked respectively to the brushes 8. With regard to the brush support 7' for the brushes 8', this is mounted so as to slide on the support 7 via the splines 9. The supports 7 and 7' may thus undergo together rotational movement about the axis X—X with respect to the support 5, the translational movement taking place between the supports 7 and 7' Assuming that the cable 1 and the support 5 are fastened to a stationary structure, the device for connection between the cables 1 and 2 thus includes a rotor 7-7' whose two parts 7 and 7' may move translationally one with respect to the other. The cable 2 may therefore be fastened to a structure able to move, with respect to the stationary structure, both translationally and rotationally (case A in the table given above).

With a view to a particular application to helicopters, this connection device, for example, having to be housed in the hub of the tail rotor, the assumption may also be made that the cable 1 is able to move only translationally, at the same time as the servocontrol rod for changing the screw pitch, and that the cable 2 is able to move only rotationally, having to supply, for example, heating current to the blades of the rotor in order to provide anti-icing. This corresponds to case C in the table.

Consequently, in this case, and taking as reference the structure of the helicopter, the support 5 is able to move translationally, the support 7/support 5' combination is able to move translationally and rotationally and the brush support 7' is able to move only rotationally, at the same time as the cable 2.

Figure 4:
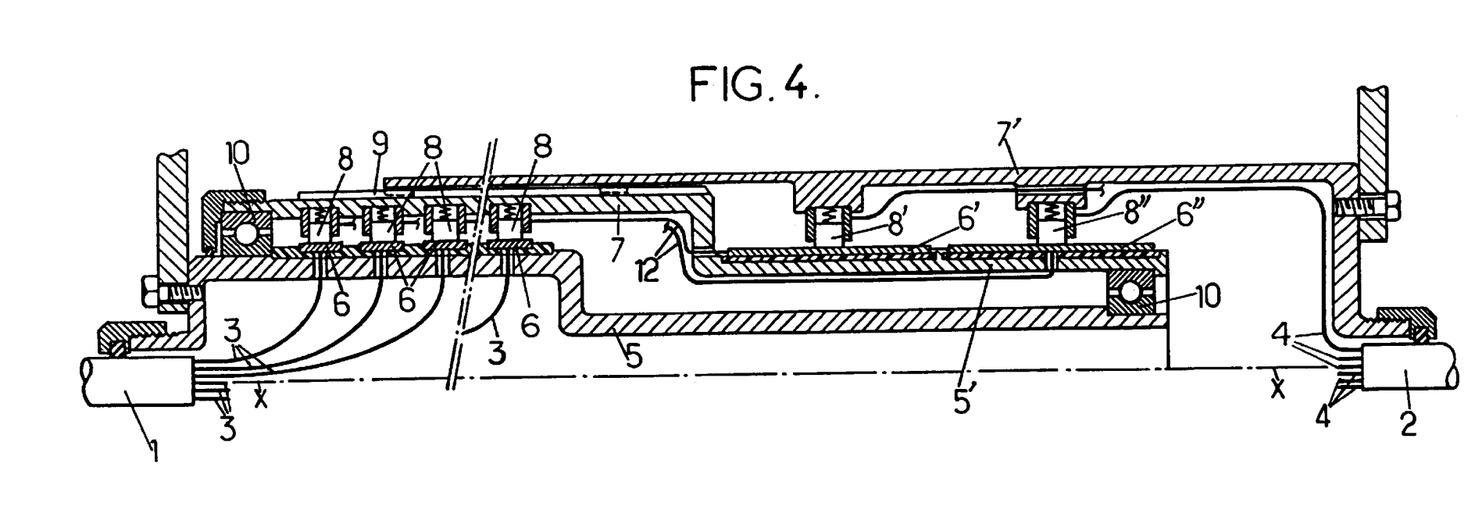
FIG. 4 shows, in axial half-section, a variant of the embodiment in FIG. 3.

The embodiment in FIG. 4 derives from that in FIG. 3, but in this case with two series of longitudinal tracks 6' and 6" arranged coaxially one behind the other on a support 5' constituting, as previously, the extension of the brush support 7. The brush support 7' carries two series of brushes 8' and 8", each of them sliding, respectively, over a track 6' and over a track 6". If there are, for example, twelve conductors 3 and twelve brushes 8, six of them may be linked respectively to six longitudinal tracks 6' and from there, via the six brushes 8', to six conductors 4, and the remaining six brushes 8 may be linked respectively to the other six longitudinal tracks 6" and from there, via the other six brushes 8" to the remaining six conductors 4 of the cable 2, any other combination, of course, being possible. This separation makes it possible, when required, to separate large currents (for heating the blades) from small currents (measurement signals or other signals).

It should be noted that, according to one variant, and according to the general concepts indicated at the beginning, the brushes 8' and 8" could be provided on the support 5' and the longitudinal tracks 6' and 6" on the support 7'; likewise, the rings 6 could be provided on the support 7 and the brushes 8 on the support 5 (a configuration similar to that in FIG. 10 (FIG. IV) instead of that in FIG. 9 (FIG. III). This variant is also applicable to the embodiment in FIG. 3 described above.

Figure 5:
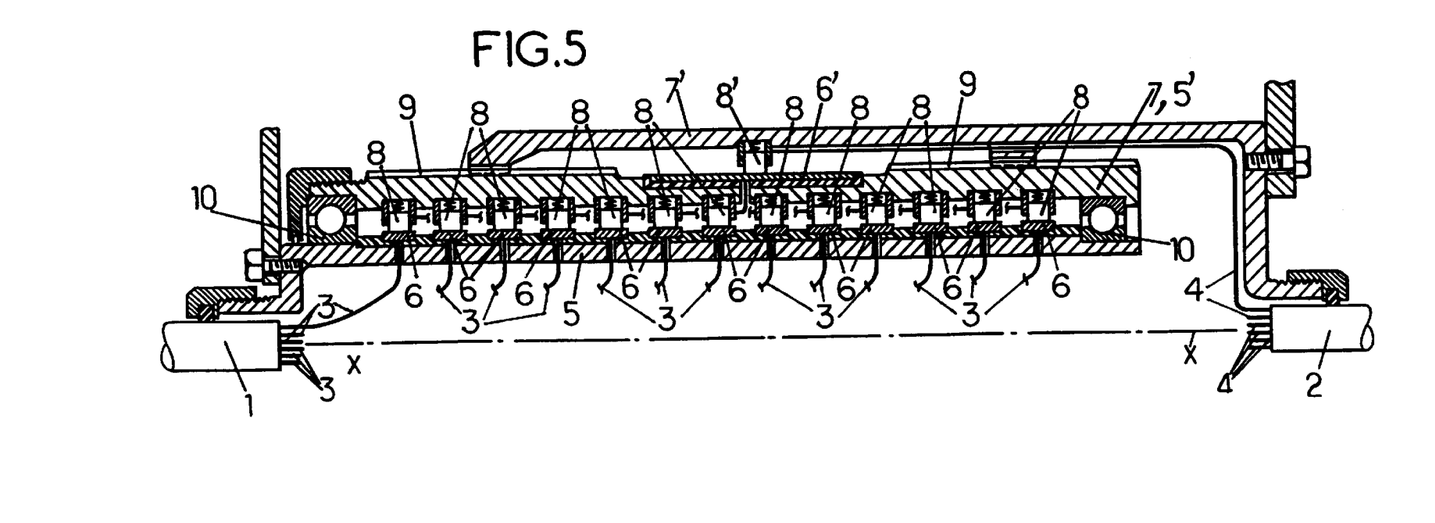
FIG. 5 is a view, in axial half-section, of another variant.

The embodiment in FIG. 5 is similar to that in FIG. 3, but with a series of longitudinal tracks 6' which is arranged radially outside the system of rotational sliding contacts and centrally with respect to the brush support 7, which serves at the same time as support 5' for the tracks 6'. Compared to the embodiment in FIG. 3, the overall axial length of the device is therefore decreased since the length of the tracks 6' is not added to the overall axial length of the brushes 8; the size in the radial direction is again very small. It may be seen here that the support 7', which carries the brushes 8', is guided in translational movement, towards its ends, by a splined guiding system 9 on the brush support 7, which is mounted so as to rotate on the support 5 by the rolling bearings 10, in a manner similar to the embodiment in FIG. 3.

It is therefore possible to have here, as in the case in FIGS. 2 to 4, the following configuration, which corresponds to case C in the table given above and which enables the device to be mounted in the hub of the tail rotor of a helicopter:

(cable 1+support 5 and rings 6): translational movement (T);

(brush support 7, brushes 8, support 5', tracks 6'): rotational and translational movement (R+T);

(brush support 7', brushes 8'): rotational movement (R).

Figure 5A:
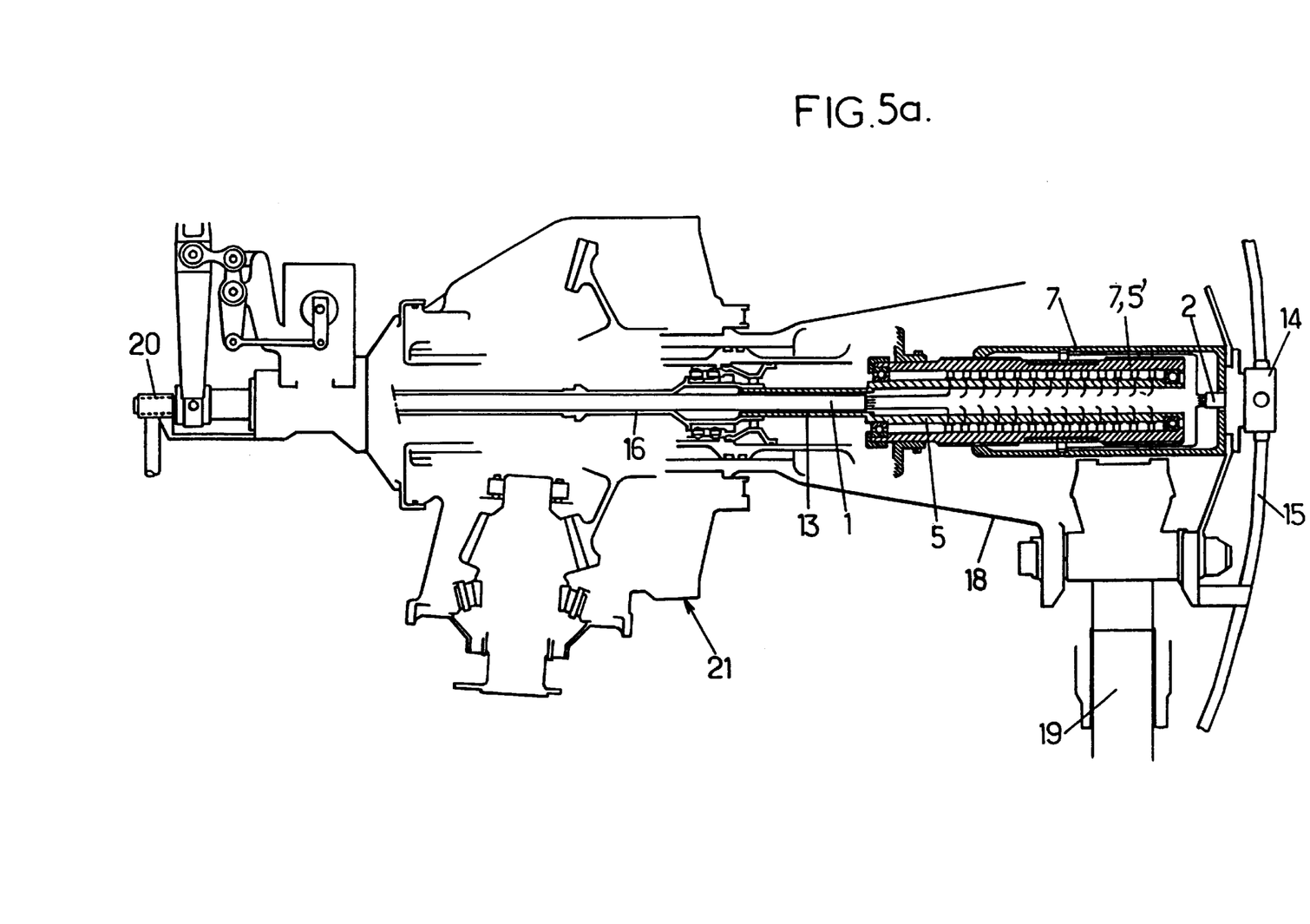
FIG. 5a shows a connection device according to the invention installed, being mounted in the hub of a helicopter tail rotor.

In FIG. 5a, the non-rotating part, able to move translationally with the servocontrol rod 16 for controlling the pitch of the rotor blades, has been labelled 13, fastened to which part 13 is the external end of the cable 1; this cable passes through the mechanical part (tail-rotor gearbox 21) via the aforementioned rod 16 for controlling the pitch of the rotor blades, one of these blades being labelled 19. The label 14 denotes an electrical distribution terminal block on which the rotating cable 2 terminates and from which cables 15 for supplying current to the blades 19 leave; the label 18 denotes the rotor hub which therefore contains the connection device of the invention. Finally, the label 20 denotes a flexible cable connector or a linear commutator, for delivering the supply current to the internal end of the cable 1 which is able to move translationally. In this FIG. 5a, it may be assumed, for example, that the connection device in FIG. 5, or a similar device, has been used.

Figure 6:
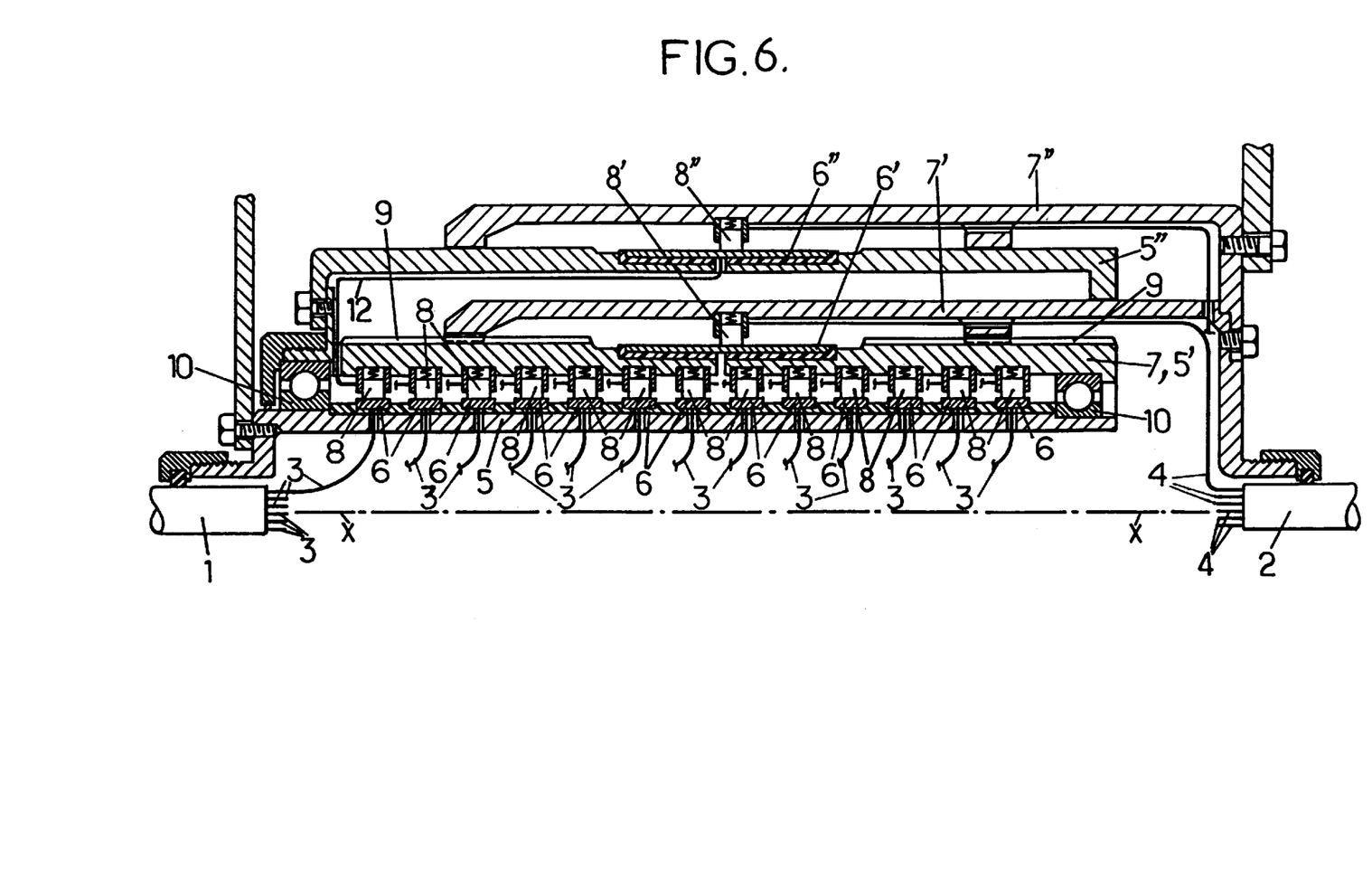
FIG. 6 shows, also in axial half-section, an extension of the embodiment in FIG. 5.

Finally, the inspiration for the variant in FIG. 6 is both the embodiment in FIG. 4 (two series of longitudinal tracks 6' and 6") and the embodiment in FIG. 5 (tracks 6' and 6"

arranged radially one outside the other, around the support 5). The numerical labels used clearly show the analogies. However, in the embodiment in FIG. 6, there are two brush supports 7' and 7" radially spaced apart, instead of there being only one of them, as in the embodiment in FIG. 4. These two supports are translationally and rotationally fastened to each other: in translational movement, they can slide longitudinally in the splines 9 of the brush support 7 which constitutes at the same time the support 5', and rotationally by virtue of the rolling bearings 10 carried by the support 5.

In this embodiment, and by way of a variant, it may be assumed that the cable 2 is stationary and the cable 1 is able to move rotationally and translationally with respect to the cable 2 (theoretical case D in the table). With this assumption, the connection device then includes a rotor or rotating part comprising the support 5 and its rings 6, which rotor moves rotationally with respect to the brush support 7 (serving at the same time as support 5'). The 5-7 (5') and 5" (second support for the second series of longitudinal tracks 6") combination can move translationally with respect to a stationary part or stator, which then comprises the brush supports 7' and 7" which carry, respectively, the two series of stationary brushes 8' and 8". The reverse arrangement could also be adopted, using a stationary cable 1 and a cable 2 which is able to move rotationally and translationally (case A in the table). It will be understood, in any case, that the latter embodiment will be preferred, compared to the embodiment in FIG. 4, when it is desired to decrease the axial length of the device and when there is less constraint in terms of radial size.

What is claimed is:

1. A device for connection between respective conductors of two cables which can undergo at least one movement selected from the group consisting of rotational movement and translational movement, one with respect to another, said device including at least one series of sliding contact elements linked to conductors of one of the two cables and carried by a first support, and at least another series of sliding contact elements linked to conductors of another of the two cables, in sliding contact, respectively, with the at least one series of sliding contact elements and carried by another support, which is able to move with respect to the first support; said device comprising at least one system of rotational sliding contacts comprising, two respective rotational sliding contact supports, one of which may be rotationally driven with respect to another, for two respective series of rotational sliding contact elements;

at least one system of translational sliding contacts comprising, two respective translational sliding contact supports, one of which may be translationally driven with respect to another, for two respective series of translational sliding contact elements;

wherein conductors of one of the two cables are linked respectively to selected sliding contact elements of one of the two series of rotational sliding contact elements of the system of rotational sliding contacts and to selected translational sliding contact elements of one of the two series of translational sliding contact elements of the system of translational sliding contacts, each said one series being carried by a common support; and wherein selected translational sliding contact elements of another series of translational sliding contact elements of the system of translational sliding contacts are linked respectively to other conductors of another of the two cables.

2. A device according to claim 1, wherein said series of rotational sliding contact elements of said system of rotational sliding contacts comprise rotatable brushes in sliding contact respectively with rotatable coaxial conducting rings on a first cylindrical support, the first cylindrical support for said rotatable brushes and the first cylindrical support for said rotatable coaxial rings being able to undergo rotational movement one with respect to another.

3. A device according to claim 1, wherein said series of translational sliding contact elements of said at least one system of translational sliding contacts comprise translational brushes in sliding contact respectively with longitudinal conducting tracks on a second cylindrical support, the second cylindrical support for said longitudinal conducting tracks and said second cylindrical support for corresponding said translational brushes being able to undergo translational movement one with respect another.

4. A device according to claim 1, comprising a splined guiding system between said common support and a translational sliding contact support for sliding contact elements of said at least one system of translational sliding contacts.

5. A device according to claim 1, wherein said common support at least partially surrounds a rotational sliding contact support for said at least one system of rotational sliding contacts.

6. A device according to claim 1, wherein said at least one system of rotational sliding contacts and said at least one system of translational sliding contacts are merged into a single merged system of rotational and translational sliding contacts and the conductors of one of the two cables are linked respectively to a series of rotational sliding contact elements of said system and conductors of another of the two cables are linked to another series of sliding contact elements of said system, the respective support for the two said series of sliding contact elements being able to be rotationally and translationally driven one with respect to another.

7. A device according to claim 1, wherein said device is mounted inside a helicopter tail rotor hub, the conductors of one of said two cables are linked respectively to the selected sliding contact elements of a series of sliding contact elements able to move translationally, and conductors of another of said two cables are linked respectively to sliding contact elements of a series of sliding contact elements able to move rotationally, wherein one of said series belongs to a system of rotational sliding contacts and another of said series belongs to a system of translational sliding contacts.

8. A device according to claim 3, wherein said at least one system of translational sliding contacts comprises a first system of translational sliding contacts comprising translational brushes in sliding contact respectively with selected longitudinal conducting tracks on a first cylindrical support and a second system of translational sliding contacts comprising second brushes in sliding contact respectively with other longitudinal conducting tracks on another cylindrical support wherein at least one of said rotational sliding contacts which is linked to the first system and the second system of translational sliding contacts is connected to translational sliding contact elements of one of said first system and said second system of translational sliding contacts and to other sliding contact elements of another system of translational sliding contacts.

9. A device according to claim 8, wherein said selected longitudinal conducting tracks and said other longitudinal conducting tracks are arranged in at least two series of translational sliding contact elements, following axially one after another on a same cylindrical support.

10. A device according to claim 8, wherein said selected longitudinal conducting tracks, and said other longitudinal conducting tracks and respective brush supports, are arranged in at least two series of translational sliding contact elements on two coaxial cylindrical supports, one of which at least partially surrounds another and which are fastened to each other.

11. A device according to claim 6, wherein one of said series of sliding contact elements comprises brushes carried by a support, and another series of sliding contact elements comprises coaxial cylindrical rings carried by a cylindrical support.

12. A helicopter tail rotor hub comprising a connection device selected from the group of connection devices defined by one of claims 1, 2, 3, 4, 5, 6, 7, 8, 9, 10 and 11.

* * * * *